(No Model.)
C. H. PAXSON.
LAWN MOWER.
No. 293,507.
Patented Feb. 12, 1884.
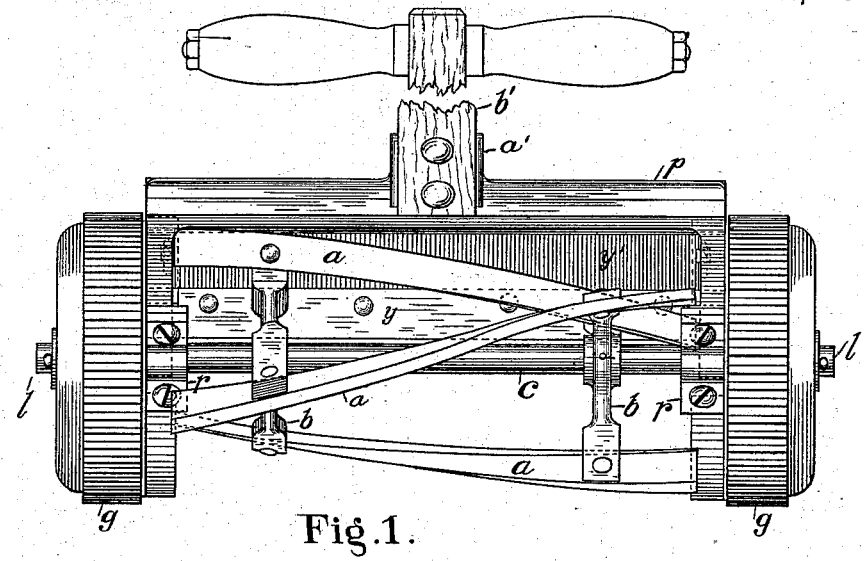
Fig. 1.
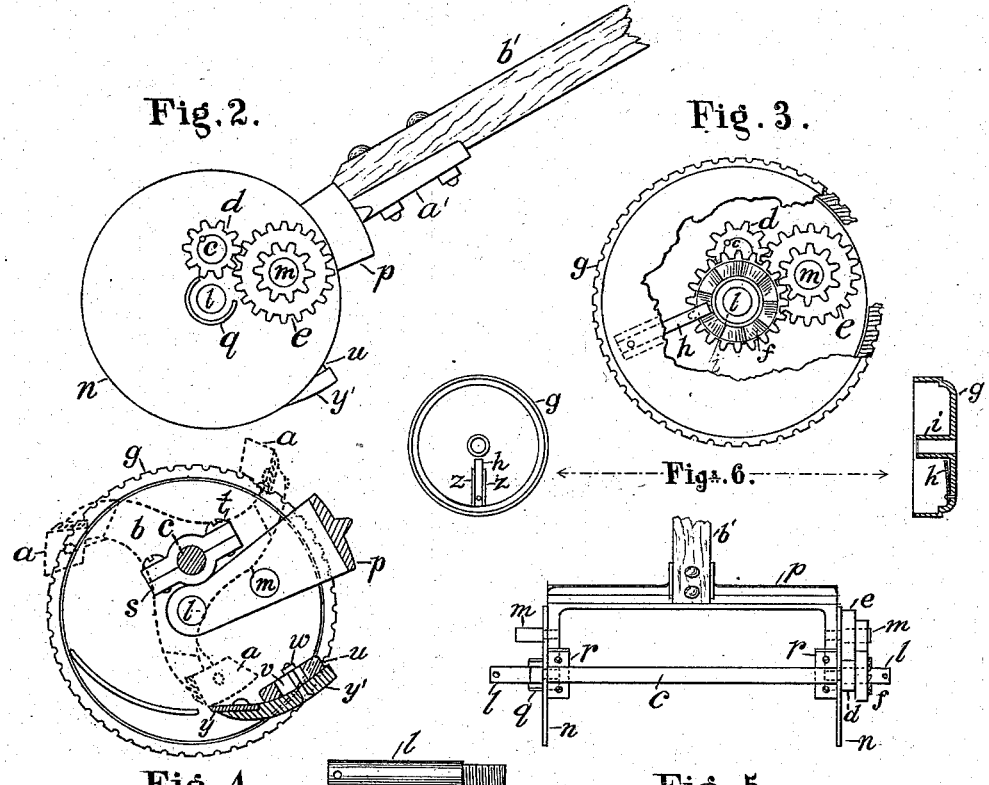
Fig. 2.   Fig. 3.
Fig. 6.
Fig. 4.   Fig. 7.   Fig. 5.
Attest:
J. Richards
A. L. Woolley
Charles H. Paxson,
Inventor.
by Henry Millward,
attorney.
N. PETERS, Photo-Lithographer, Washington, D. C.

UNITED STATES PATENT OFFICE.

CHARLES H. PAXSON, OF SPRINGFIELD, ASSIGNOR OF ONE-HALF TO PETER T. COFFIELD, OF NEW CARLISLE, OHIO.

LAWN-MOWER.

SPECIFICATION forming part of Letters Patent No. 293,507, dated February 12, 1884.

Application filed June 6, 1883. (No model.)

*To all whom it may concern:*

Be it known that I, CHARLES H. PAXSON, of Springfield, county of Clarke, State of Ohio, have invented a new and useful Improvement in Lawn-Mowers, of which the following is a specification.

In the accompanying drawings, Figure 1 is a plan view of a lawn-mower with my improvements attached thereto. Fig. 2 is an end view of the ground-wheel with the cap and its initial gear removed for the purposes of perspicuity. Fig. 3 is an end view of the ground-wheel with part of the grass-cap broken away. Fig. 4 is a transverse section of a lawn-mower embodying my improvements with the spiral cutting-reel represented in broken lines. Fig. 5 is a plan view of the mower with the cutting-reel and ground-wheels removed. Figs. 6 are views of the ground-wheels and attached pawl, and Fig. 7 is a plan of a combined securing-bolt and stud-axle.

In each of these figures letters of like character indicate corresponding parts.

This invention relates to lawn-mowers that have a series of revolving spiral knives which rotate in contact with the rectilinear edge of a stationary knife placed tangentially thereto, so that the spiral knives, when rotated by the gear connected to the supporting-wheels, reel in and cut off blades of grass between their cutting-edges and the aforesaid stationary knife, and the cut grass is delivered behind said knives.

This invention consists in the novel construction and combination of parts hereinafter described and claimed.

In order that others skilled in the art to which my invention belongs may make and use the same, I will proceed to describe its construction and operation.

The series of spiral knives $a$ are mounted upon arms $b$, that are made secure to a shaft, $c$. The shaft $c$ is rotated by a pinion, $d$, which meshes into the double spur-wheel $e$, and this double spur-wheel receives its motion from a ratcheted spur-wheel, $f$, that is attached to the ground-wheel $g$ by means of a spring-pawl, $h$, and cast sleeve $i$. Each of the ground-wheels is similarly equipped with spur-wheels, and consequently the shaft $c$ is provided with two pinions. In view of the fact that both ground-wheels are thus similarly equipped, in the subsequent portion of the specification I shall confine myself to a description of one.

The ground-wheel $g$ revolves around a stationary stud, $l$, and the double spur-wheel $e$ revolves around a stationary stud, $m$. The studs $l$ $m$ are each provided with a shoulder that rests against a disk, $n$, and a screw-thread that passes through said disk and into a female thread formed in the metallic brace $p$, by which means the aforesaid studs not only form journals for the wheel $g$ and gear $e$, but also serve as a means for securing the brace $p$ to the disk $n$.

The ratcheted spur-wheel $f$ rests against the partial circumferential distance-piece $q$. This distance-piece serves to prevent the initial spur-wheel $f$ from rubbing against the double spur-wheel $e$ and pinion $d$. The shaft $c$ is journaled in bearings $r$. The bearings $r$ are in two parts, the part $s$ being cast to the disk $n$, and the part $t$ being secured to the part $s$ by means of screws. (See Fig. 4.) That part of the shaft $c$ that passes through the bearings $r$, is of smaller diameter than the part that the arms $b$ are secured to, and thereby forms a shoulder. This shaft, after passing through the aforesaid bearings, passes through the disk $n$, and the pinion $d$ is rigidly secured to it. On the disk $n$ there is cast a lug, $u$, provided with an elongated aperture, $v$, through which a screw-bolt, $w$, passes to adjustably secure the rectilinear knife $y$, to the aforesaid lugs. This knife is supported by a cast-metal back, $y'$, in the manner shown in Fig. 4 of the drawings. The spur-wheel $f$ is provided with a ratcheted surface that engages with the spring-pawl $h$, and the pawl $h$ is supported on its sides by projections $z$, that are cast upon the disk $n$. The brace $p$ is provided at its mid-length with a receptacle, $a'$, for the accommodation of the propelling-handle $b'$.

In operation the revolving spiral reel $a$ reels in the blades of grass against the rectilinear edges of the knife $y$, and as each of the beaters of said reel is provided with a spiral cutting-edge, the blades of grass are continuously sheared off and forced to the rear of the mower. The cutting-edges in time become worn and have to be resharpened, and their relative positions are thus changed. To compensate for this, I have provided for the adjustment of the rectilinear cutting-edge of the stationary knife, as above specified, so that the adjustment will be in a circle eccentric to the circle of rotation of the reel.

Having thus described my invention, what I claim as new, and desire to secure by Letters Patent, is—

1. In a lawn-mower, the combination of the brace $p$, ground-wheels $g$, reel $a$, and actuating-gearing with the two stationary disks $n\ n$, around which the ground-wheels revolve, each disk provided with a bearing, $r$, for the reel-shaft, and studs $l\ m$, that serve as journals for the ground-wheels and the gears $e$, and also as a means of securing the brace to the disks, substantially as described.

2. In a lawn-mower, the combination of the disks $n\ n$, studs $l\ m$, gear-wheels $f\ e\ d$, reel-shaft $c$, bearings $r\ r$, and distance-pieces $q$, substantially as described.

3. In a lawn-mower, the combination of the ground-wheel $g$, provided with sleeve $i$, spring-pawl $h$, and ratchet spur-wheel $f$, substantially as described.

4. In a lawn-mower, the combination of a revolving reel, $a$, and adjustable rectangular cutting-knife $y\ y'$, the gearing $f\ d\ e$, partial circumferential distance-pieces $q$, and ground-wheels $g$, substantially as described.

In testimony whereof I have hereunto set my hand this 2d day of May, 1883.

CHARLES H. PAXSON.

Witnesses:
HENRY MILLWARD,
I. RICHARDS.